Oct. 18, 1932.  T. M. GILLIN  1,883,692

PIPE HICKEY

Filed Jan. 9, 1931

Inventor:-
Theobald M. Gillin
by his Attorneys
Howson & Howson

Patented Oct. 18, 1932

1,883,692

UNITED STATES PATENT OFFICE

THEOBALD M. GILLIN, OF ALDAN, PENNSYLVANIA, ASSIGNOR OF ONE-THIRD TO WILLIAM W. PATTON AND ONE-THIRD TO ARTHUR WINE, BOTH OF PHILADELPHIA, PENNSYLVANIA

PIPE HICKEY

Application filed January 9, 1931. Serial No. 507,669.

This invention relates to pipe hickeys, and more particularly to a device for forming short bends in pipe. In bending pipe, particularly the light pipe employed as conduit for electrical wiring, it is extremely difficult to make a short bend near the end of the pipe without damaging the threads or destroying the threaded end to such an extent that it is impossible to fit a coupling thereon. Short bends near the ends of electrical conduit are often essential, particularly in concrete structures where the pipe is laid within the concrete floor and is often disturbed during the laying of the floor and must be rebent after the floor has been completed. With the ordinary apparatus now available for making such bends, it is necessary under such circumstances to form a very large opening in the floor so that the apparatus may be applied to the pipe, with the result that a considerable patching job must be done after completion of the bending operation. Furthermore, such apparatus is often worthless in making these short bends, as hereinbefore stated. Accordingly, an important object of the present invention is the provision of a tool which will enable a buried pipe to be engaged without the formation of a large opening and a short bend to be formed therein without damage to the threads or distortion of the threaded end.

A further object of the invention is the provision of an apparatus of this character which will enable the formation of bends of any desired radius and with only the desired length of material in the actual bend.

Figure 1:
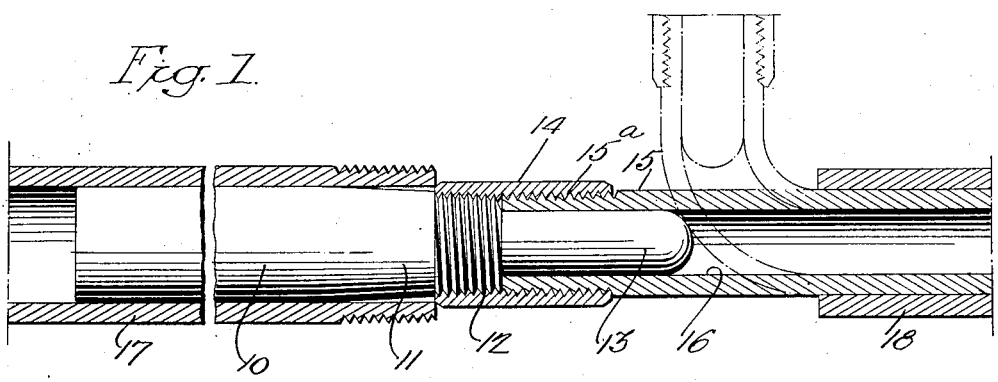
Figure 2:
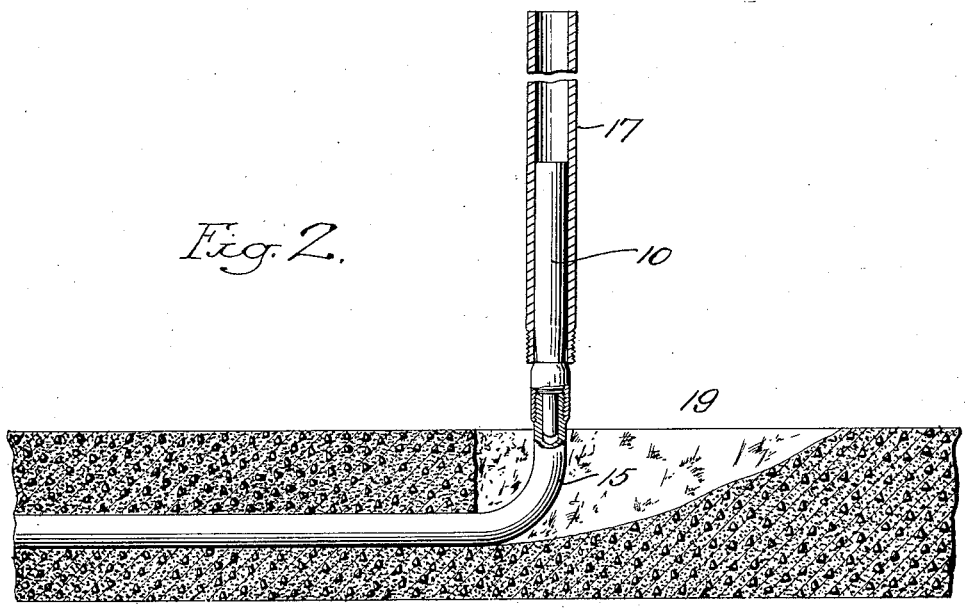

These and other objects I attain by the construction shown in the accompanying drawing wherein, for the purpose of illustration, I have shown a preferred embodiment of my invention, and wherein:

Figure 1 is a longitudinal sectional view showing the hickey applied to bend a pipe and illustrating the formed bend in dotted lines; and Fig. 2 is a view partially in section, illustrating the bending of an embedded conduit.

Referring now more particularly to the drawing, the tool proper comprises a shank 10 which may be conveniently formed from round bar or shafting steel, this shank adjacent one end being slightly tapered at 11 to a threaded portion 12. Projecting from the end of this threaded portion is a filet headed stud 13 of reduced diameter with relation to the threaded portion. In construction of the tool the threaded portion 12 is made of a size to receive a coupling 14 of the size employed on the pipe 15 which the tool is designed to accommodate. The stud 13 is made of a diameter to snugly fit within the bore 16 of the pipe 15 without actually binding therein and of a length such that it projects well beyond the end of the coupling 14 when applied to the threaded portion of the shank. The diameter of the shank 10 is preferably of a size such that it will fit within a piece of standard pipe 17, the selected diameter preferably being slightly less than the outside diameter of coupling 12 so that when the piece of pipe 17 is applied over the shank the coupling will act to check its movement thereover. The pipe 17 when employed merely provides an extension of shank 10.

In use of the tool, to form a bend in a piece of pipe, assuming that there are six inches available from the end of the piece of pipe within which the bend must be formed, a sleeve 18 is slid over the pipe to a point within six inches of the end and the exposed threaded end of the pipe is screwed into the coupling 14. The sleeve 18 and the shank 10 are then shifted until the exposed section of the pipe between the end of the sleeve and the end of stud 13 is bent through the desired angle. The formation of the stud 13 with a filet head prevents this stud from digging into or otherwise damaging the walls of the pipe 15, the threaded portion 15—a of pipe 15 being in effect a clamp between the coupling 14 and the stud 13, and the projection of the stud 13 beyond the end of this coupling prevents any bending or distortion of the threaded end of the pipe.

In use of the tool in forming bends in embedded pipe, the pipe is merely exposed by breaking away the embedding material at 19 until the desired length is available. The breakage need not extend to the sides of the pipe at those portions where the break actually overlies the pipe, and at those portions beyond the edge of the pipe where the break is made to permit the tool to be engaged with the end of the pipe; the breakage need only be made sufficiently large to accommodate coupling 15. The tool is then attached to the end of the pipe as hereinbefore described and the bend formed.

It will be obvious that a device of this character provides a cheap and readily constructed tool which is admirably adapted for use in the formation of short bends in pipe. It will also be obvious that this construction is capable of some modification without in any manner departing from the spirit of my invention; I, accordingly, do not wish to be understood as limiting myself to the particular arrangement herein disclosed except as herein claimed.

I claim:

1. A pipe hickey comprising a shank having an interiorly threaded socket at one end adapted to receive a piece of pipe to be bent and a stud projecting from the base of the socket and of greater length than the depth of the socket, said stud being of a size to interiorly fit the pipe to be bent.

2. A pipe hickey comprising a shank having a reduced stud projecting axially from one end thereof and adapted to interiorly fit a piece of pipe to be bent, said shank adjacent said end having a threaded portion to receive one end of a coupling of a size to engage the pipe to be bent.

3. A pipe hickey comprising a shank having a reduced tang projecting axially from one end thereof and adapted to interiorly fit a piece of pipe to be bent, said shank adjacent said end having a threaded portion to receive one end of a coupling of a size to engage the pipe to be bent, and a sleeve to surround the pipe to be bent in spaced relation to the end of the tang.

4. A pipe hickey comprising a shank having a reduced stud projecting axially from one end thereof and adapted to interiorly fit a piece of pipe to be bent, said shank adjacent said end having a threaded portion to receive one end of a coupling of a size to engage the pipe to be bent, the stud having a fillet head.

5. A pipe hickey comprising a shank having a reduced stud projecting axially from one end thereof and adapted to interiorly fit a piece of pipe to be bent, said shank adjacent said end having a threaded portion to receive one end of a coupling of a size to engage the pipe to be bent, the shank having an external diameter less than the external diameter of such coupling.

THEOBALD M. GILLIN.